(12) United States Patent
Chandrasekaran et al.

(10) Patent No.: US 11,687,611 B2
(45) Date of Patent: Jun. 27, 2023

(54) INTERMEDIATE WIDGET CACHE

(71) Applicant: ServiceNow, Inc., Santa Clara, CA (US)

(72) Inventors: Yuvaraj Chandrasekaran, Newark, CA (US); Bryce D. Gelinas, Spokane, WA (US); Ayman Amoodi, Sunnyvale, CA (US); Sai Divya Panditi, San Jose, CA (US); Rajeshbabu Ramasamy, Tracy, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/503,133

(22) Filed: Oct. 15, 2021

(65) Prior Publication Data
US 2023/0124081 A1 Apr. 20, 2023

(51) Int. Cl.
*G06F 3/00* (2006.01)
*G06F 16/957* (2019.01)
*H04L 67/02* (2022.01)
*G06F 9/54* (2006.01)
*G06F 9/451* (2018.01)

(52) U.S. Cl.
CPC ......... *G06F 16/9574* (2019.01); *G06F 9/451* (2018.02); *G06F 9/547* (2013.01); *H04L 67/02* (2013.01)

(58) Field of Classification Search
CPC ....... G06F 16/9547; G06F 9/451; H04L 67/02
See application file for complete search history.

(56) References Cited

U.S. PATENT DOCUMENTS

| | | | |
|---|---|---|---|
| 8,667,415 B2 * | 3/2014 | Rudolph | G06F 16/958 715/761 |
| 2012/0284356 A1 * | 11/2012 | Luna | G06F 16/9574 709/213 |
| 2017/0147158 A1 * | 5/2017 | Mukhopadhyay | G06F 3/0605 |
| 2019/0079782 A1 * | 3/2019 | Goldberg | H04L 67/303 |
| 2019/0215021 A1 * | 7/2019 | Frishman | H03M 13/09 |
| 2022/0261139 A1 * | 8/2022 | Phoutchanthavongsa | G06F 3/04847 |

* cited by examiner

*Primary Examiner* — Chirag R Patel
(74) *Attorney, Agent, or Firm* — Van Pelt, Yi & James LLP

(57) ABSTRACT

A request is received from a client for data to render a modular contained widget component of an application user interface. Whether the requested data is cached at an intermediary server is determined at the intermediary server, wherein the requested data is based at least in part on one or more database records stored at a backend server. In response to a determination that the requested data is cached, the requested data is obtained from an identified cache instance that cached the requested data. The cached requested data is based at least in part on the one or more database records provided by the backend server to the intermediary server to maintain an updated version of the requested data at the identified cache instance. The requested data is provided to the client from the intermediary server.

20 Claims, 6 Drawing Sheets

INTERMEDIATE WIDGET CACHE

BACKGROUND OF THE INVENTION

Cloud-based services allow customers to store, access, and manage small to large volumes of customer data that can be accessed remotely from a variety of clients. The provided customer data, which can be permanently stored in a cloud-based data store, can be a diverse assortment of content data including information on incident reports, hardware and software assets, and employee timesheets, among others. Using a web client, the content data can be dynamically accessed via a cloud-based cloud application. Functionality of the web application can be distributed across both the web client and the cloud-based application server backend.

BRIEF DESCRIPTION OF THE DRAWINGS

Various embodiments of the invention are disclosed in the following detailed description and the accompanying drawings.

DETAILED DESCRIPTION

Figure 1:
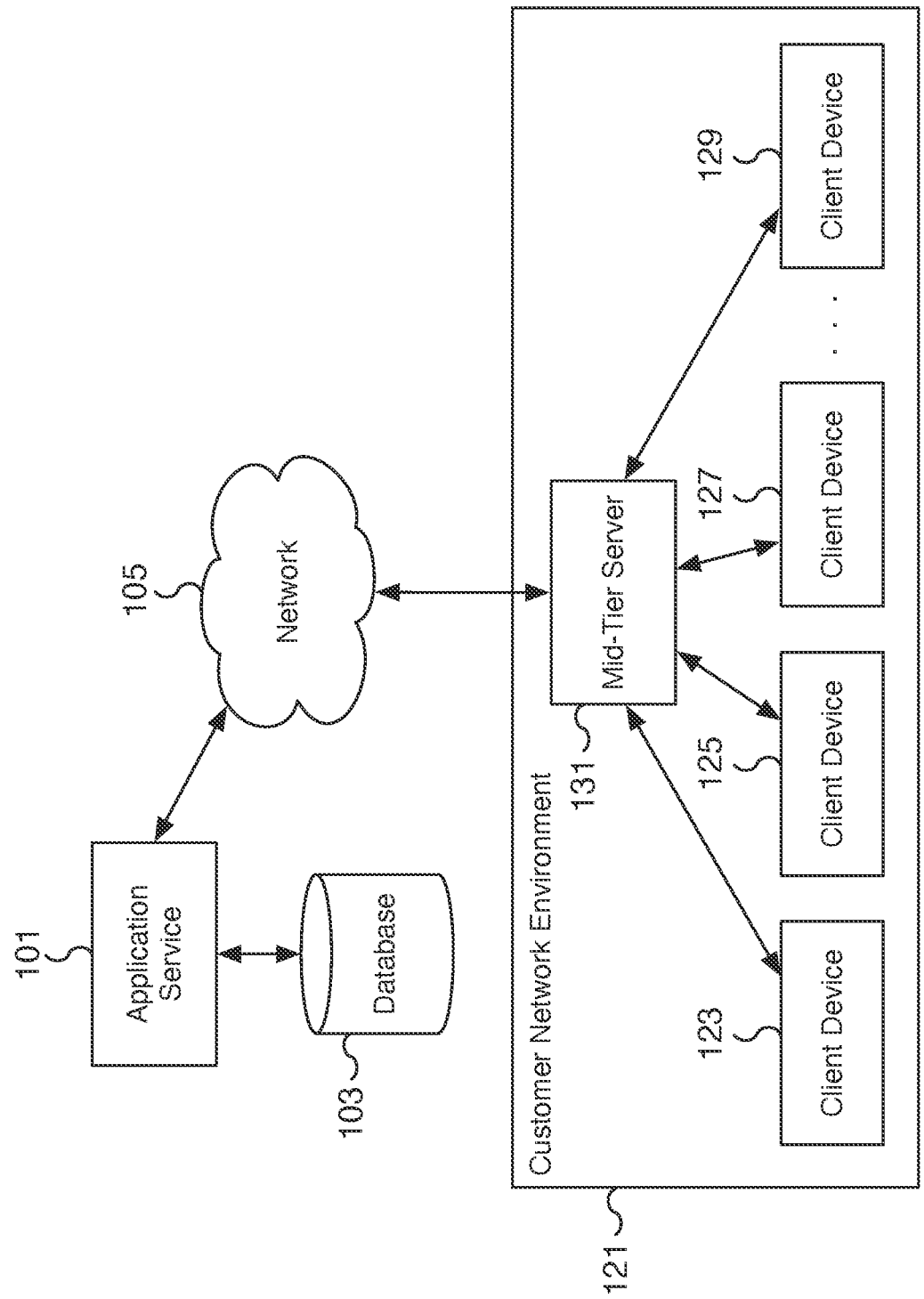
FIG. 1 is a block diagram illustrating an example of a network environment for implementing an intermediate widget cache.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An intermediate widget cache for web applications is disclosed. Using the disclosed techniques, a web application can utilize cached widget components for constructing a client-side user interface for an associated web client. The cached widget components are reusable common functionality that can be shared across different web clients and provide functionality for accessing and manipulating data stored at the application server such as data corresponding to database records stored at a cloud-based data store. In various embodiments, the cached widget components are managed and stored at an intermediary server. When the data records are updated at the cloud-based backend, the cached widgets associated with the updated records are updated as well. When accessed via the web client, the updated cached widgets are provided by the intermediary server for constructing the web client user interface. In various embodiments, the cached widgets are managed in an intermediate widget cache based on a widget identifier. In some embodiments, the widget cache includes multiple layers based on an identifier such as a widget identifier. Additional layers of the widget cache can be appropriate as well. For example, the widget cache can include a user identifier layer to cache different instances of the same widget component customized for different users. Other identifiers and associated/additional layers can be implemented as well, for example, to cache different widgets by a customer identifier and/or other identifiers such as identifiers associated with categories and/or sub-organizations of a customer.

In some embodiments, a request for data to render a modular contained widget component of an application user interface is received from a client. For example, a webpage of a client web application may be constructed from multiple widget components, such as a header widget, a footer widget, and one or more additional widgets for implementing page functionality. Each widget component can participate in the rendering of a portion of the overall webpage. As part of the overall rendering process, an intermediary server receives a request for a widget component used to construct the webpage. At the intermediary server, a determination is made whether the requested data is cached at the intermediary server, wherein the requested data is based at least in part on one or more database records stored at a backend server. For example, a widget component is based on one or more database records stored at a cloud-based backend server. The database records can include records corresponding to customer incidents, information technology tickets, employee timesheets, and/or other database records. The latest database records are used to construct corresponding cached widget components for storing at the intermediary server. When a request for a widget component is received at the intermediary server, a widget cache component, such as a widget mapper and resolver component, running on the intermediary server determines whether a cached version of the widget exists. In the event a cached version exists, the cached widget component is based on the most up to date database records stored at the backend server. In response to a determination that the requested data is cached, the requested data is obtained from an identified cache instance that cached the requested data. For example, the requested cached widget component is retrieved from the intermediary server based on one or more resolved layers of a widget cache. The layers can be identified by a widget identifier and in some instances, one or more identifiers can be used to resolve between multiple layers of the widget cache. In some embodiments, the cached requested data is based at least in part on the one or more database records provided by the backend server to the intermediary server to maintain an updated version of the requested data at the identified cache instance. For example, the widgets stored at the widget cache can be updated based on the associated database records used to implement the corresponding widgets. In the event an associated database record is updated, the corresponding widgets can be updated as well to maintain updated versions of the cached widgets. In various embodiments, the requested data is provided to the client from the intermediary server. For example, the updated version of a cached widget is provided to the web client in response to the data request associated with the modular contained widget component for rendering the associated webpage of the application user interface.

FIG. 1 is a block diagram illustrating an example of a network environment for implementing an intermediate widget cache. In the example shown, application service 101 and customer network environment 121 are connected via network 105. Network 105 can be a public or private network. In some embodiments, network 105 is a public network such as the Internet. In various embodiments, application service 101 is a cloud-based application service that utilizes database 103, which is communicatively connected to application service 101. In the example shown, customer network environment 121 is a customer information technology environment and includes mid-tier server 131 and multiple customer devices represented as client devices 123, 125, 127, and 129. In various embodiments, mid-tier server 131 functions as an intermediate widget cache for storing cached widget components associated with web applications hosted by application service 101. For example, clients of customer network environment 121, such as one or more of client devices 123, 125, 127, and 129, can access web services of application service 101 via mid-tier server 131. In the process of accessing the provided web services, cached versions of one or more widget components can be provided by the intermediate widget cache of mid-tier server 131. The cached widgets utilize the most up to date database records of database 103 and can be used to construct and render the user interface of the associated web application.

In some embodiments, application service 101 provides cloud-based services including cloud-based services associated with managing operations of enterprise environments among other potential application services. For example, various network clients associated with an enterprise environment, such as customer network environment 121 and corresponding client devices 123, 125, 127, and 129, can access the provided application services of application service 101. The provided services can be accessible via a web user interface constructed using widget components. Widget components allow the provided services of application service 101 to utilize reusable common functionality that can be shared across different web clients. The widget components can further include functionality that utilizes data managed by application service 101 including data from database records of an associated cloud-based data store such as of database 103. In some embodiments, application service 101 provides server-side functionality such as server-side support for caching widgets at an intermediate widget cache. For example, application service 101 can provide service Application Programming Interfaces (APIs) for accessing information associated with a widget from mid-tier server 131.

In some embodiments, database 103 is a cloud-based data store utilized by application service 101 for providing application services. For example, database 103 can store database records for information utilized by the provided application services of application service 101 such as database records of customer incidents, information technology tickets, employee timesheets, and/or other appropriate database records. In some embodiments, database 103 is a configuration management database (CMDB) used at least in part for managing assets that are under the management of an organization, such as the devices of customer network environment 121. Each managed asset can be represented as a configuration item. In some embodiments, database 103 can store information related to managed assets, such as the hardware and/or software configuration of a computing device, as configuration items. In various embodiments, database 103 includes functionality for tracking modified database records. For example, an audit table (not shown) of database 103 can be used to track the modification of database records associated with cached widgets. By tracking when database records associated with cached widgets are modified, the associated cached widgets can be updated at the intermediate widget cache.

In some embodiments, customer network environment 121 is an information technology network environment and includes mid-tier server 131 and multiple hardware devices including client devices 123, 125, 127, and 129, as examples. In various embodiments, customer network environment 121 is connected to network 105 and can include one or more network security devices such as a firewall and/or gateway (not shown). In various embodiments, the devices of customer network environment 121, such as client devices 123, 125, 127, and 129, can be used to access application services of application service 101. The requested application services can be accessed via mid-tier server 131. For example, a request for a web application of application service 101 is first processed by mid-tier server 131. Mid-tier server 131 can provide cached widgets associated with the request or, in the event a widget is not cached, can forward the request to application service 101. Depending on the widget caching policy, the widget provided by applications service 101 can be updated and/or cached at mid-tier server 131. On subsequent requests, the cached widget can instead be provided by mid-tier server 131.

In the example shown, mid-tier server 131 is an intranet server of customer network environment 121. In various embodiments, customer network environment 121 is configured to utilize mid-tier server 131 as an intermediate server and widget cache of application service 101. For example, mid-tier server 131 can cache and serve cached widget components corresponding to widget components of a web application of application service 101. In some embodiments, requests from clients, such as from client devices 123, 125, 127, and/or 129, to application service 101 are handled by a widget mapper and resolver component (not shown) of mid-tier server 131 to determine whether a cached widget should and can be provided by the widget cache or whether application service 101 should provide the requested widget. In various embodiments, the widget cache (not shown) of mid-tier server 131 is a layered widget cache that manages the cached widgets by one or more identifiers, such as by a widget and/or user identifier. For example, the widget cache can cache different customized versions of the same widget component for different users. In various embodiments, a cached widget can include functionality, including programmable functionality, and cached data associated with one or more database records. The cached widget can be utilized for framing and/or rendering a portion of a web user interface.

In various embodiments, the components shown in FIG. 1 may exist in various combinations of hardware machines. Although single instances of components have been shown to simplify the diagram, additional instances of any of the components shown in FIG. 1 may exist. For example, application service 101 may include one or more cloud-based servers. Similarly, database 103 may not be directly connected to application service 101 and/or may be replicated or distributed across multiple components. For customer network environment 121, additional or fewer devices may exist and some components, such as a firewall and/or gateway device, may exist but are not shown. In some embodiments, components not shown in FIG. 1 may also exist.

Figure 2:
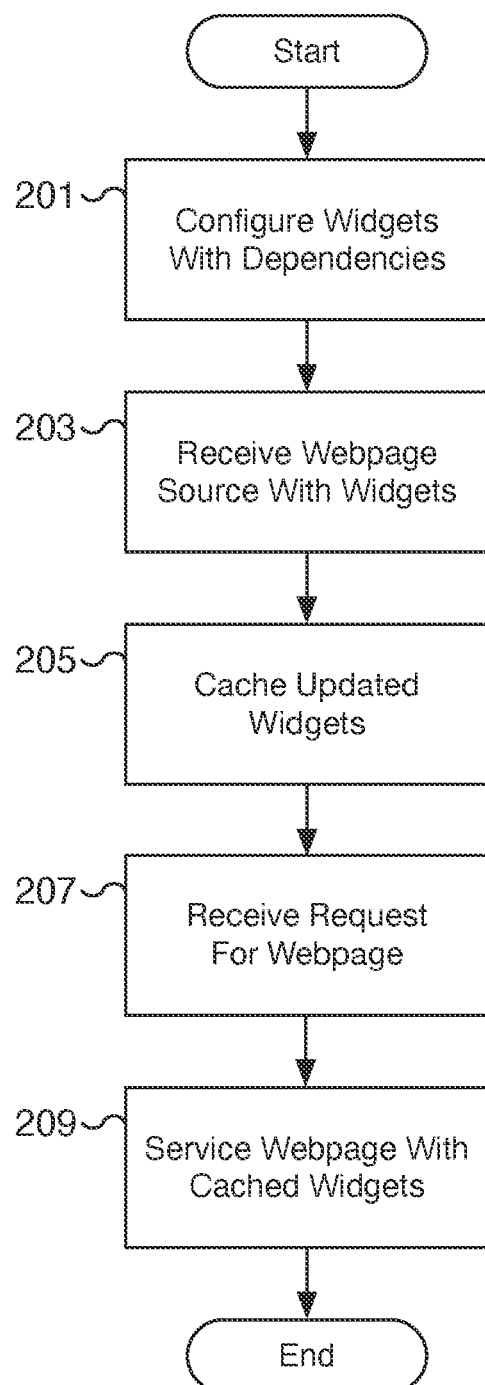
FIG. 2 is a flow chart illustrating an embodiment of a process for implementing a web client application that utilizes cacheable widget components at an intermediate server.

FIG. 2 is a flow chart illustrating an embodiment of a process for implementing a web client application that utilizes cacheable widget components at an intermediate server. In various embodiments, the process of FIG. 2 can be implemented using the components of FIG. 1, including application service 101, database 103, and mid-tier server 131 of FIG. 1 to provide an application service to clients of the network environment such as client devices 123, 125, 127, and/or 129 of customer network environment 121 of FIG. 1. In some embodiments, the intermediate server is mid-tier server 131 of FIG. 1, which caches widget components associated with hosted services of application service 101 of FIG. 1. Using the disclosed techniques, a web application service can provide a user interface composed of one or more widget components. The widget components provide reusable common functionality that can further reference database records of a cloud-based database service such as database 103 of FIG. 1. By caching widget components at an intermediate server, the scalability and performance of the cloud-based application service is significantly improved. In various embodiments, a cached widget can be used to render a web user interface and can implement interactive functionality based on remotely referenced database records.

At 201, widgets are configured with dependencies. For example, one or more widget components are configured to determine at least the database records each widget is dependent on to remain valid. In the event one of the database records associated with a configured widget is updated, the widget will no longer be up to date and will require updating. For example, the widget component will need the updated values of the associated database records whenever the database records are updated. In some embodiments, the validity of the referenced database records is tracked using an audit table, such as an audit table of the reference database service. The audit table may monitor transactions performed on the database to identify dependencies.

At 203, a webpage source with widgets is received. For example, a webpage is created that utilizes one or more widget components. As one example, a webpage can include a header widget, a footer widget, and multiple widgets for implementing different functionality of the webpage such as a widget for retrieving and displaying active information technology ticket requests and another widget for retrieving and displaying a specific user's assigned information technology incidents. In various embodiments, the webpage source is stored on a database server and can be served to clients via an application service. In some embodiments, the webpage source is generated dynamically, for example, via a programmable template.

At 205, updated widgets are cached. For example, the widgets utilized for a webpage are cached at a widget cache of an intermediate server. In various embodiments, each cached widget is preloaded with the current and most up to date values of its associated database records. In some embodiments, at least some portions of applicable application widget data can be precomputed to improve performance of the cached widget. In various embodiments, the widgets cached are based on the expected utilization of webpages. In some embodiments, the widgets cached can be based on the expected work hours of users. For example, widgets for North American employees can be cached ahead of the expected work hours for workers located in North American and widgets for Asian employees can be cached ahead of the expected work hours for workers located in Asia. The time-based approach to preloading cached widgets can be based on the different time zones associated with users, different expected and/or scheduled work hours for users, different expected and/or scheduled start times for users, and/or expected/predicted access patterns for associated users, etc.

At 207, a request for a webpage is received. For example, a client of a customer network environment requests a webpage from the application service. The webpage requested corresponds to the webpage source created with widgets received at 203. In some embodiments, the request is processed via an intermediate server which determines which widget components of the requested webpage are to be served from the widget cache and which widget components are to be served from the application server.

At 209, a webpage is serviced with one or more cached widgets. For example, the webpage requested at 207 is provided to the requesting client. Any applicable widgets that are cached are served from the widget cache associated with the intermediate server. In the event a widget is not cached, the widget is retrieved from the application server. In some embodiments, a widget served from the application server is cached at the widget cache as part of the retrieval process. In various embodiments, as part of serving cached widgets, the webpage is analyzed to resolve and map referenced widgets to a layer of the widget cache. This resolution and mapping process allows a widget to be cached based on different levels of granularity, such as dynamic and static widgets as well as widgets customized for different users.

Figure 3:
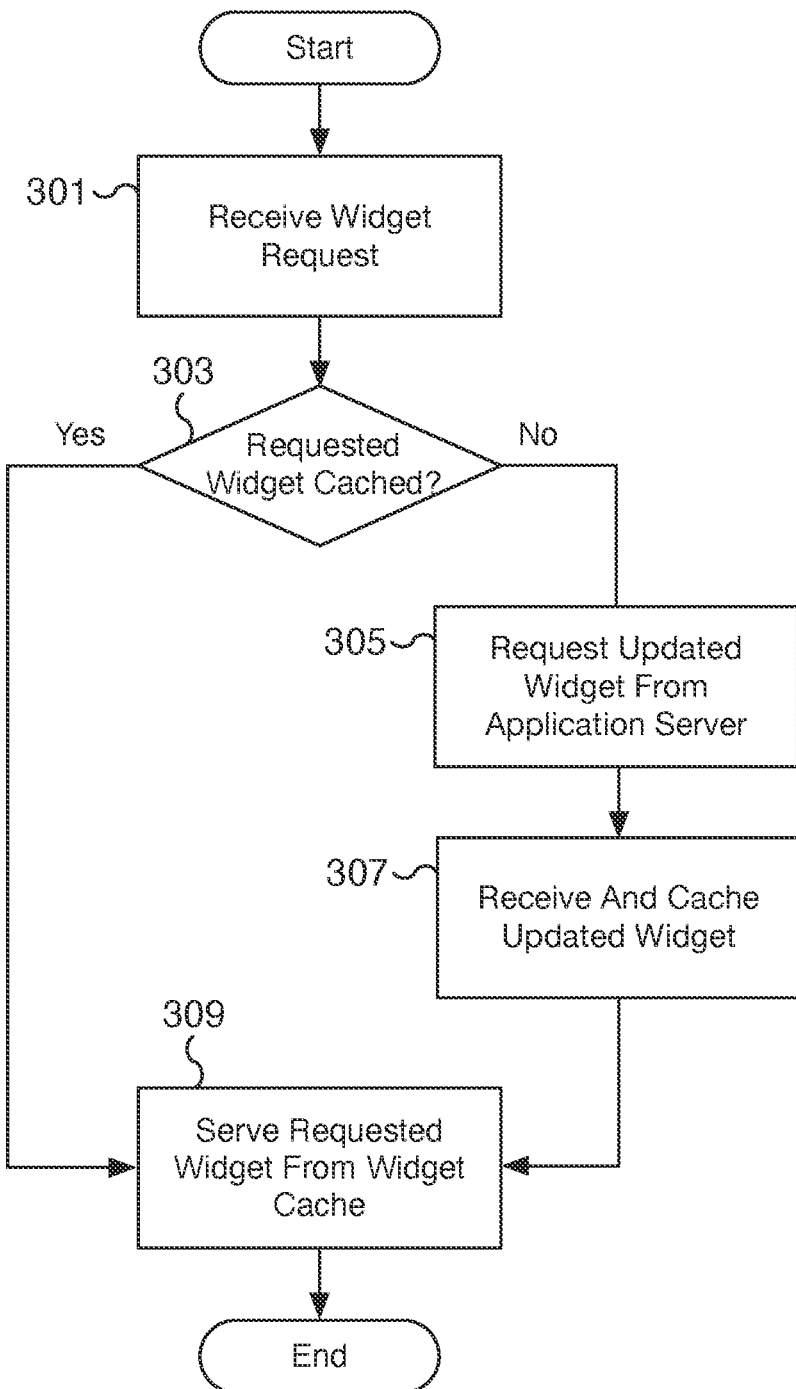
FIG. 3 is a flow chart illustrating an embodiment of a process for serving a widget component request as part of a webpage request.

FIG. 3 is a flow chart illustrating an embodiment of a process for serving a widget component request as part of a webpage request. In various embodiments, the process of FIG. 3 can be implemented using the components of FIG. 1, including application service 101, database 103, and mid-tier server 131 of FIG. 1. For example, an intermediate server, such as mid-tier server 131 of FIG. 1, in response to a widget component request, determines whether to serve a cached widget component from the widget cache of the intermediate server or whether to relay the widget component request to the origin application server. The served widget component can provide reusable common functionality that can reference database records of a cloud-based database service such as database 103 of FIG. 1. In various embodiments, a cached widget can be used to render a web user interface and can implement interactive functionality based on remotely referenced database records. In some embodiments, the process of FIG. 3 is performed at 207 and/or 209 of FIG. 2.

At 301, a widget request is received. For example, as part of a request for a webpage associated with an application service, a widget request is made by a client from a customer network environment. In various embodiments, the request is received at an intermediate server configured as part of the network environment. In some embodiments, the request is received and processed by a widget mapper and resolver component of the intermediate server.

At 303, a determination is made whether the requested widget is cached. In the event the requested widget is cached, processing proceeds to 309. For example, at 309, the cached widget can be served from the widget cache based on a resolved widget identifier. In the event the requested widget is not cached, processing proceeds to 305. For example, at 305, a widget cache miss is resolved by requesting the widget from the application server.

At 305, the updated widget is requested from the application server. For example, a valid instance of the requested widget does not exist in the widget cache of the intermediate server and a request is made to an application server for the updated widget component. In some embodiments, the request is made using server-side scripting and/or Application Programming Interface (API) calls. The request for the updated widget ensures that the widget provided to the client at 309 will contain the most up to date values for the associated database records of the widget component.

At 307, an updated widget is received and cached. For example, an updated widget is received at the intermediate server in response to the widget request forwarded to the application server at 305. Once received at the intermediate server, the updated version of the widget is cached. The updated version includes updated values of any associated database records the widget relies on. In some embodiments, the widget is cached in a multi-layer widget cache. For example, the widget cache can store both dynamic as well as static widgets. In some embodiments, static widgets can be shared across different users, may be infrequently updated, and/or in some scenarios may not reference database records that are subject to changes. For example, in some embodiments, static widgets may reference only read-only database records. In various embodiments, dynamic widgets can reference database records but require updated values of the associated database records in the event any of the associated database records change.

In some embodiments, the cached widgets include and/or reference programmable functionality such as client-side and/or server-side scripts. Moreover, the reusable common functionality of the widget can be shared across different domains such as user domains. For example, different users can utilize the same widget and its associated reusable functionality. Although different users can share the same widget, each instance of the widget can be customized for a different user. For example, different instances of the same dynamic widget can reference different sets of database records. Since the same widget can have different instances, the widgets can be cached by instance, such as by a user identifier and/or by another layer parameter.

In some embodiments, when caching a received updated widget at 307, one or more entries in the widget cache are identified and evicted to make room for the newly received widget. If space in the widget cache is available, the updated widget is cached and can be served to a client in response to the current and/or subsequent widget requests. In some embodiments, the widget is cached only in the event the user associated with the widget request has an associated valid widget layer. For example, in some embodiments, the widget cache allows caching on a per user level of granularity. A particular widget is cached only in the event caching is enabled for the user and/or the user's widgets are actively present in the widget cache.

At 309, the requested widget is served from the widget cache. For example, a cached widget from either a cache hit or a cache miss is provided to the requesting client. In the event of a cache miss, the cached widget served is the widget received in response to the request made at 305 and updated at 307. In various embodiments, the client utilizes the received widget to render at least a portion of an associated webpage of an application service.

Figure 4:
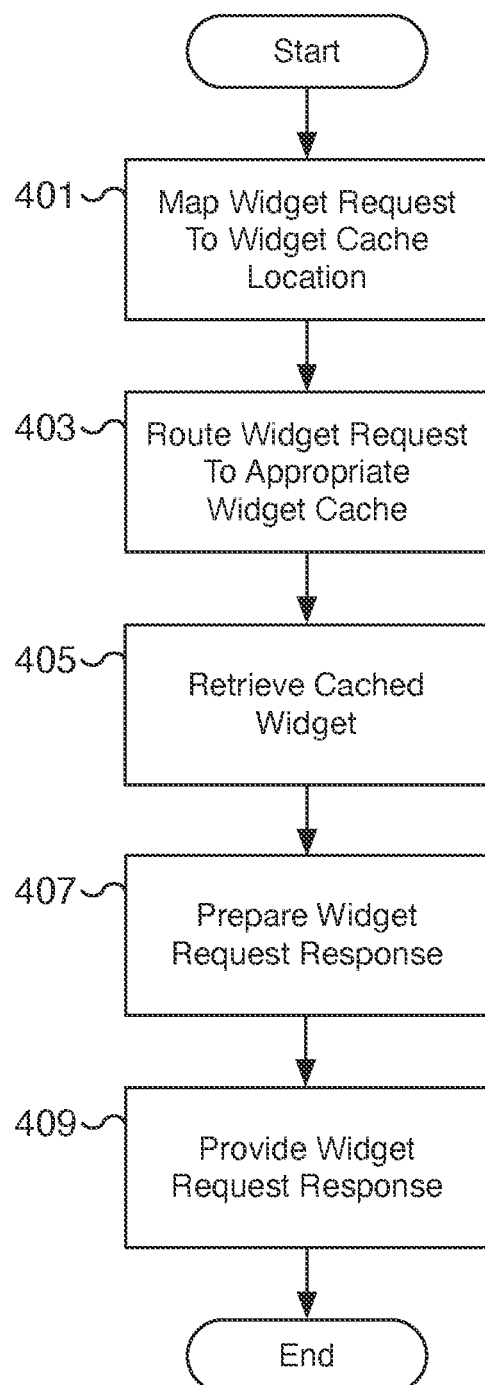
FIG. 4 is a flow chart illustrating an embodiment of a process for serving a cached widget component from a widget cache.

FIG. 4 is a flow chart illustrating an embodiment of a process for serving a cached widget component from a widget cache. In various embodiments, the process of FIG. 4 is performed by an intermediate server such as mid-tier server 131 of FIG. 1 in response to a widget component request for a valid and cached widget. The served widget component can provide reusable common functionality that can reference database records of a cloud-based database service such as database 103 of FIG. 1. In various embodiments, a cached widget can be used to render a web user interface and can implement interactive functionality based on remotely referenced database records. In some embodiments, the process of FIG. 4 is performed at 207 and/or 209 of FIG. 2 and/or at 303 and/or 309 of FIG. 3.

At 401, a widget request is mapped to a widget cache location. For example, a widget mapper component of widget cache receives a request for a widget component. Using the widget mapper component, the widget request is mapped to a particular widget cache or portion of a widget cache associated with the requested cached widget. In some embodiments, the mapping is determined based on a widget identifier and/or additional identifiers such as a customer and/or user/employee identifier. In various embodiments, an intermediate server can cache widgets associated with different application servers and mappings are used to identify the appropriate widget cache (or portion of a widget cache) for the relevant application server. In some embodiments, depending on how widget components are compartmentalized, the widget request is mapped to one of multiple widget caches and/or to a portion of a widget cache such as a widget entry location of the determined widget cache.

In some embodiments, the mapping determines which layer of a widget cache from which to fetch the cached widget. For example, a widget cache can include cache areas for dynamic and static widgets. Further, a widget cache can include different layers for different instances of the same widget. For example, the same widget can be cached for different users. In the example, the different instances of the same widget can be unique since they each reference different database records. In various embodiments, the different instances map to a different portion or layer of a widget cache or to different widget caches.

At 403, the widget request is routed to the appropriate widget cache. Based on the mapping determined at 401, the widget request is routed to the appropriate widget cache storing the cached widget. In some embodiments, the routing is performed by a widget router component. In various embodiments, the widget is routed to a particular layer of the widget cache. For example, a widget cache route destination may specify the particular widget cache and which layer of the widget cache the requested widget resides.

At 405, the cached widget is retrieved. For example, the cached widget is retrieved from the appropriate layer of the widget cache. In some embodiments, depending on the type of widget, the cached widget is stored in a dynamic layer or a static layer of the widget cache. In some embodiments, the cached widget is stored in a cache location based on multiple layer identifiers such as by a first customer identifier layer and a second user/employee identifier layer. In various embodiments, the cached widget is retrieved from the determined layer of the appropriate widget cache.

At 407, a widget request response is prepared. For example, a response is prepared that includes the retrieved cached widget packaged as a widget request response. In some embodiments, the widget request response is encapsulated in an HTTP or similar network response. In some embodiments, the prepared widget response includes the appropriate destination routing information based on the location of the client that initiated the widget request.

At 409, the response for the widget request is provided. For example, the widget response prepared at 407 is provided back to the client that initiated the widget request. In some embodiments, the request is routed to the client via the widget mapper and router components.

Figure 5:
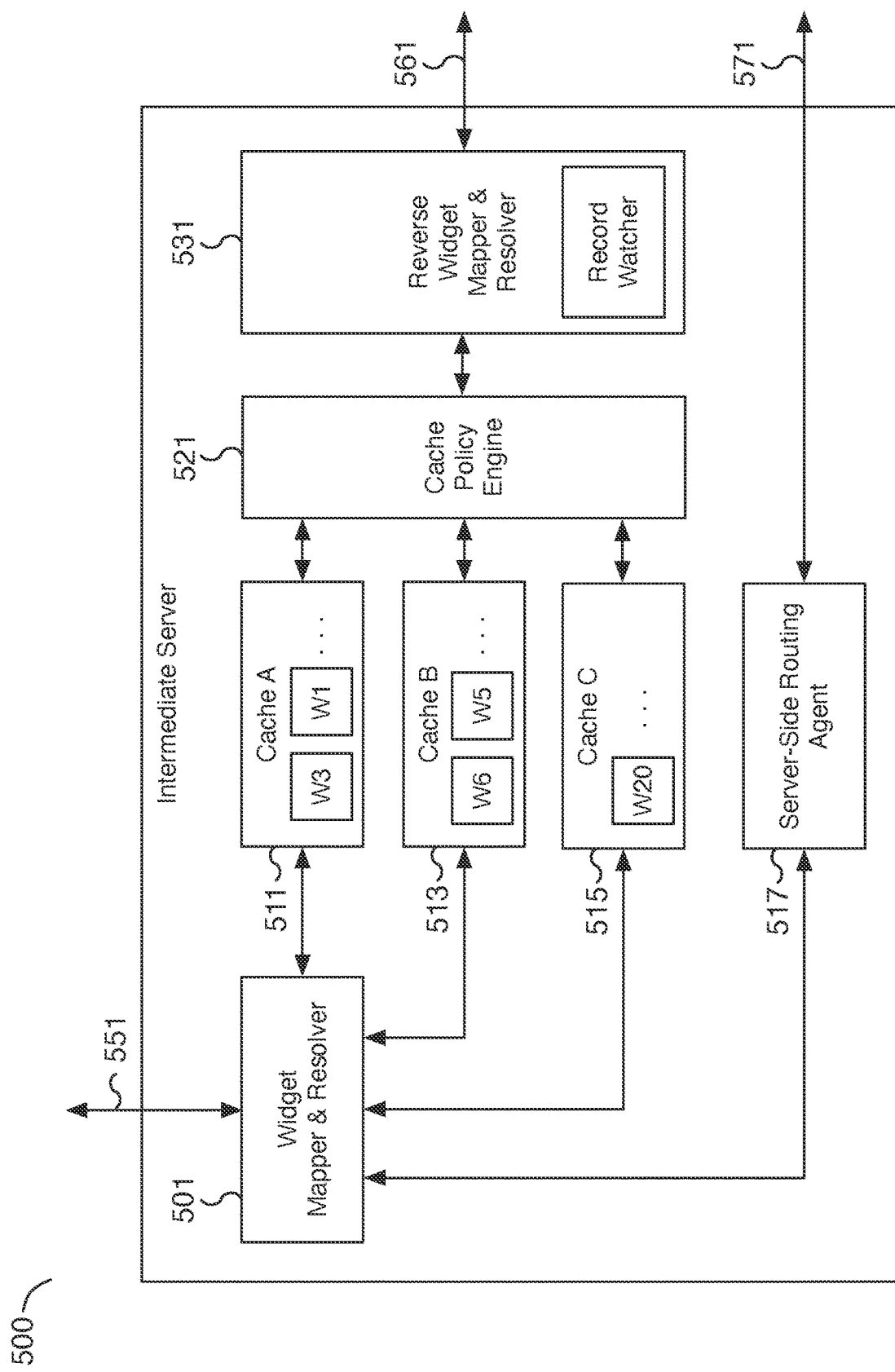
FIG. 5 is a block diagram illustrating an example of an intermediate server for caching widget components.

FIG. 5 is a block diagram illustrating an example of an intermediate server for caching widget components. In the example shown, intermediate server widget cache 500 is an intermediate server configured in a customer network environment for caching widget components utilized for web applications. In some embodiments, intermediate server widget cache 500 is mid-tier server 131 of FIG. 1 and receives requests for widget components from the clients of the customer network environment 121 of FIG. 1 such as client devices 123, 125, 127, and 129 of FIG. 1. Intermediate server widget cache 500 includes widget mapper and resolver component 501, widget caches 511, 513, and 515, server-side routing agent 517, cache policy engine 521, and reverse widget mapper and resolver component 531. Intermediate server widget cache 500 also includes network connections 551, 561, and 571. In various embodiments, intermediate server widget cache 500 is utilized at least in part to perform the processes of FIGS. 2-4.

In some embodiments, widget mapper and resolver component 501 is utilized to map and route a widget request to a widget cache location in the event of a cache hit and to the application service in the event of a cache miss. For example, widget mapper and resolver component 501 receives a widget request via network connection 551 and can map a widget identifier of the widget request to a cache location or a cache instance in the event the requested widget is cached. In various embodiments, intermediate server widget cache 500 includes multiple cache instances or widget caches, and widget mapper and resolver component 501 maps and routes the widget request to a particular cache instance or widget cache. As shown in the example, destination cache instances include widget caches 511, 513, and 515. In some embodiments, the widget request processed by widget mapper and resolver component 501 includes multiple identifiers in addition to the widget identifier such as a customer and/or user identifier. In the event a widget cache includes multiple layers, for example, for different instances of the same widget, widget mapper and resolver component 501 can map and route a widget request to the appropriate layer of a multi-layer widget cache. In some embodiments, widget mapper and resolver component 501 is implemented as two components, a separate widget mapper component and a separate widget resolver component.

As shown in the example of FIG. 5, widget mapper and resolver component 501 is communicatively connected to server-side routing agent 517. In the event a requested widget is not cached, widget mapper and resolver component 501 routes the request to server-side routing agent 517. Server-side routing agent 517 in turn routes the request to the origin application service, such as application service 101 of FIG. 1, via network connection 571. In various embodiments, server-side routing agent 517 communicates with the destination application service via server-side scripting and/or Application Programming Interface (API) calls. The actual updated widgets and/or database values associated with the requested widget are received via network connection 561 at reverse widget mapper and resolver component 531. In some embodiments, server-side routing agent 517 further receives a response from the destination application service, such as an acknowledgement that the widget request was received, via network connection 571. The response can be forwarded to widget mapper and resolver component 501.

In the example shown, intermediate server widget cache 500 includes widget caches 511, 513, and 515. Widget caches 511, 513, and 515 are shown with example widgets W3, W1, W6, W5, and W20 cached in their respective cache instances. For example, widget cache 511 (labeled Cache A) caches at least widgets W3 and W1, widget cache 513 (labeled Cache B) caches at least widgets W6 and W5, and widget cache 515 (labeled Cache C) caches at least widget W20.

In various embodiments, widget caches 511, 513, and 515 are different widget caches or widget cache instances. Each cache instance can store widgets associated with different widget identifiers. In some embodiments, the different widget caches 511, 513, and 515 store widgets associated with different application services. In some embodiments, the different widget caches 511, 513, and 515 can be static and/or dynamic widget caches. For example, in one scenario, intermediate server widget cache 500 can be configured with widget cache 511 as a global static widget cache for storing static data and widget caches 513 and 515 as dynamic widget caches, each for caching different instances of different widgets that utilize dynamic data. In various embodiments, a retrieved widget from widget caches 511, 513, or 515 is provided to widget mapper and resolver component 501 in response to a widget request. The obtained widget is then passed back to the requesting client from widget mapper and resolver component 501 via network connection 551.

In some embodiments, cache policy engine 521 is used to perform cache eviction and cache refresh functionality. For example, cache policy engine 521 can identify which entries to evict when caching a new widget. As another example, cache policy engine 521 can be used to refresh cached widgets including updating the database values associated with a widget to refresh a cached widget. In various embodiments, cache policy engine 521 receives updated widgets including database values from reverse widget mapper and resolver component 531. In some embodiments, cache policy engine 521 can be configured as appropriate for each different intermediate server widget cache. For example, an intermediate server widget cache such as intermediate server widget cache 500 can be configured to preload widgets into their appropriate caches based on the different time zones associated with users, different expected and/or scheduled work hours for users, different expected and/or scheduled start times for users, and/or expected/predicted access patterns for associated users, etc.

In some embodiments, reverse widget mapper and resolver component 531 is utilized to map and route a received widget from an application server to the appropriate widget cache via cache policy engine 521. For example, reverse widget mapper and resolver component 531 receives widget data via network connection 561 and can map a widget identifier of the received widget to a cache location or a cache instance. In various embodiments, intermediate server widget cache 500 includes multiple cache instances or widget caches, and reverse widget mapper and resolver component 531 maps and routes the received widget to a particular cache instance or widget cache for storage based on the caching policy determined by cache policy engine 521. As shown in the example, destination cache instances include widget caches 511, 513, and 515. In some embodiments, the received widget data processed by reverse widget mapper and resolver component 531 includes multiple identifiers in addition to the widget identifier such as a customer and/or user identifier. In the event a widget cache includes multiple layers, for example, for different instances of the same widget, reverse widget mapper and resolver component 531 can map and route a widget to the appropriate layer of a multi-layer widget cache. In some embodiments, reverse widget mapper and resolver component 531 is implemented as two components, a separate reverse widget mapper component and a separate reverse widget resolver component.

In some embodiments, reverse widget mapper and resolver component 531 includes a record watcher module, as shown in FIG. 5. The record watcher module can remotely monitor which database records have been updated and, in the event an updated record results in a value utilized by a cached widget becoming stale or out of date, the record watcher can update the validity of the corresponding cached widget. Similarly, the record watcher module can be utilized to update cached widgets by initiating a request for updated database values. In some embodiments, the record watcher module communicates with an audit table of the database server to monitor and track database transactions that impact widget database record dependencies.

Figure 6:
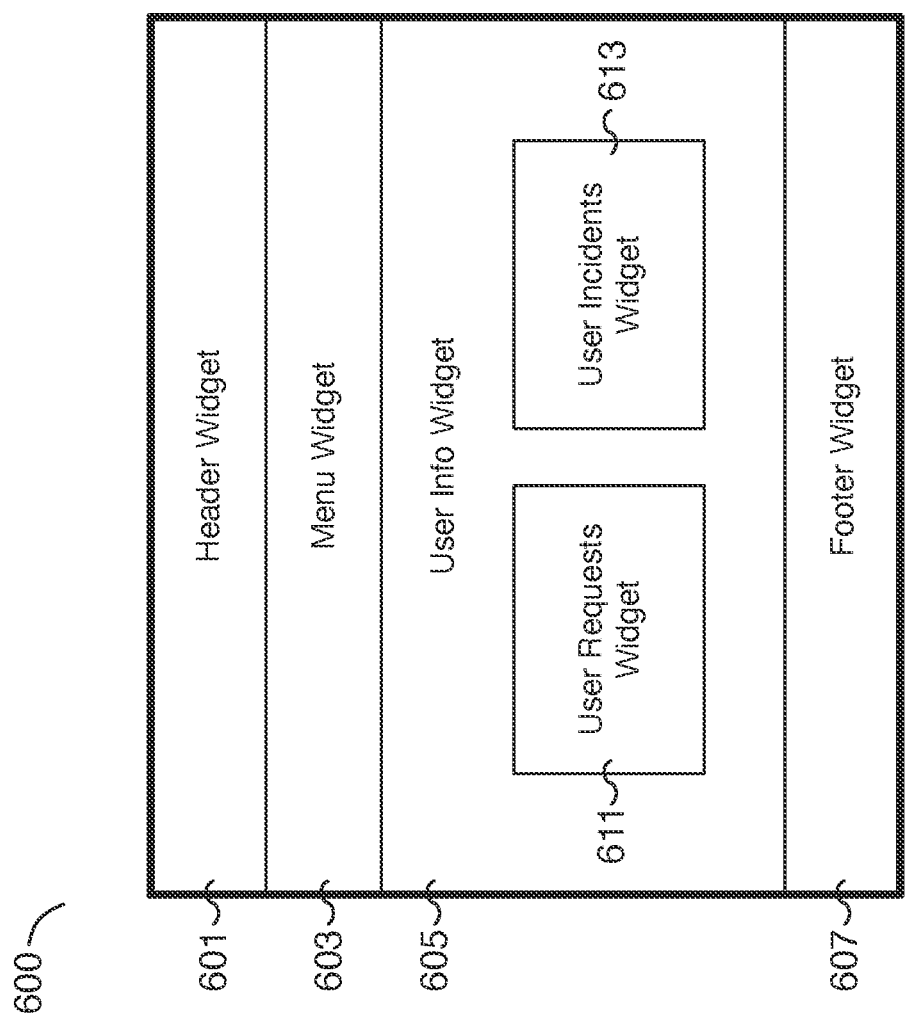
FIG. 6 is a block diagram illustrating an example of a webpage composed using widget components.

FIG. 6 is a block diagram illustrating an example of a webpage composed using widget components. In the example shown, webpage 600 is constructed using multiple widgets including header widget 601, menu widget 603, user information widget 605, and footer widget 607. As shown in the example, user information widget 605 further includes two embedded widgets: user requests widget 611 and user incidents widget 613. In various embodiments, the source for webpage 600 is constructed at an application server such as the application server providing application service 101. The widgets of webpage 600 include reusable common functionality and can reference remotely stored database records such as the database records of database 103 of FIG. 1. In various embodiments, the widgets can be cached in a widget cache of an intermediate server, such as mid-tier server 131 of FIG. 1. In some embodiments, the intermediate server widget cache is intermediate server widget cache 500 of FIG. 5. In various embodiments, the processes of FIGS. 2-4 are used at least in part to serve webpage 600 and its widgets to client devices of a customer network environment such as client devices 123, 125, 127, and 129 of FIG. 1 of customer network environment 121 of FIG. 1.

In the example shown, webpage 600 utilizes header widget 601, menu widget 603, user information widget 605, footer widget 607, user requests widget 611, and user incidents widget 613 to render webpage 600 for a client device. The shown widgets are reusable common functionality and can include web components such as HyperText Markup Language (HTML), style sheet data, and programmable scripts including client and server scripts, among other web data. When cached, the widgets are served from a widget cache instead of from the origin application service.

In some embodiments, a webpage of an application service such as webpage 600 can include both dynamic and static widgets. For example, header widget 601 and footer widget 607 are used to render a static header and footer, respectively, for webpage 600. In some embodiments, header widget 601 and footer widget 607 are static widgets and can be shared across different client users without modification. For example, employees of the same customer can share static widgets such as header widget 601 and footer widget 607. In some embodiments, a static widget can reference database records but may be limited to only accessing the same database records for all users. In various embodiments, a static widget can reference only read-only database records.

In some embodiments, the dynamic widgets of webpage 600 include menu widget 603, user information widget 605, user requests widget 611, and user incidents widget 613. Menu widget 603 is used to render a menu bar for webpage 600. The values of the menu for menu widget 603 can be dynamic and are based on the logged in user. Similarly, user information widget 605 is a dynamic widget and its functionality is also based on the logged in user. For example, user information widget 605 allows the user to interact with and display information specific for the logged in user. In the example shown, user information widget 605 includes two embedded widgets, user requests widget 611 and user incidents widget 613. User requests widget 611 is a dynamic widget that displays and allows the user to interact with information technology requests associated with the user. For example, user requests widget 611 can display information technology requests submitted by a user/employee such as a request for a new laptop or a request for time off.

Similarly, user incidents widget 613 is a dynamic widget that displays and allows the user to interact with information technology incidents associated with the user. For example, user incidents widget 613 can display and allow a user to track information technology incidents submitted by a user/employee such as a failed hardware or software incident. In various embodiments, menu widget 603, user information widget 605, user requests widget 611, and user incidents widget 613 each reference and/or are dependent on values from database records including database records associated with the specific user that is logged in. In various embodiments, dynamic widgets are cached by instance since each instance of the same widget can be unique for each user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
  determining a first expected usage start time associated with a first user;
  preloading a first data for a first modular contained widget component of an application user interface into an identified cache instance based on the first expected usage start time associated with the first user including by evicting a second data associated with a second modular contained widget component associated with a second user having a second expected usage start time different from the first expected usage start time associated with the first user;

receiving from a client, a request for the first data to render the first modular contained widget component of the application user interface;

determining at an intermediary server, whether the first data is cached at the intermediary server, wherein the first data is based at least in part on one or more database records stored at a backend server;

in response to a determination that the first data is cached, obtaining the first data from the identified cache instance that cached the first data, wherein the cached first data is based at least in part on the one or more database records provided by the backend server to the intermediary server to maintain an updated version of the first data at the identified cache instance; and providing to the client the first data from the intermediary server.

2. The method of claim 1, further comprising mapping the first data to the identified cache instance based on a widget identifier included in the request for the first data to render the first modular contained widget component of the application user interface.

3. The method of claim 2, wherein mapping the first data to the identified cache instance is further based on a user identifier included in the request for the first data to render the first modular contained widget component of the application user interface.

4. The method of claim 2, further comprising routing the request for the first data to render the first modular contained widget component of the application user interface to the identified cache instance.

5. The method of claim 1, wherein the identified cache instance stores a plurality of cached instances of the first modular contained widget component, wherein each of the plurality of cached instances of the first modular contained widget component references a different set of database records.

6. The method of claim 1, wherein the first data to render the first modular contained widget component includes HyperText Markup Language data, styling data, and one or more programmable scripts.

7. The method of claim 6, wherein the one or more programmable scripts include client-side scripts and server-side scripts.

8. The method of claim 6, wherein the first data to render the first modular contained widget component further includes values associated with the one or more database records provided by the backend server.

9. The method of claim 1, further comprising in response to a determination that a third data is not cached, obtaining the third data from the identified cache instance that cached an expired version of the third data, wherein obtaining the third data includes updating the expired version of the third data.

10. The method of claim 1, further comprising updating an expired version of the first data by at least obtaining updated values of the one or more database records provided by the backend server.

11. The method of claim 1, wherein the intermediary server includes two or more cache instances, and wherein a widget identifier of the request for the first data to render the first modular contained widget component of the application user interface maps the request to one of the two or more cache instances.

12. A system, comprising:
one or more processors; and
a memory coupled to the one or more processors, wherein the memory is configured to provide the one or more processors with instructions which when executed cause the one or more processors to:

determine a first expected usage start time associated with a first user;

preload a first data for a first modular contained widget component of an application user interface into an identified cache instance based on the first expected usage start time associated with the first user including by evicting a second data associated with a second modular contained widget component associated with a second user having a second expected usage start time different from the first expected usage start time associated with the first user;

receive from a client, a request for the first data to render the first modular contained widget component of the application user interface;

determine at an intermediary server, whether the first data is cached at the intermediary server, wherein the first data is based at least in part on one or more database records stored at a backend server;

in response to a determination that the first data is cached, obtain the first data from the identified cache instance that cached the first data, wherein the cached first data is based at least in part on the one or more database records provided by the backend server to the intermediary server to maintain an updated version of the first data at the identified cache instance; and provide to the client the first data from the intermediary server.

13. The system of claim 12, wherein the memory is further configured to provide the one or more processors with instructions which when executed cause the one or more processors to:

map the first data to the identified cache instance based on a widget identifier included in the request for the first data to render the first modular contained widget component of the application user interface.

14. The system of claim 13, wherein mapping the first data to the identified cache instance is further based on a user identifier included in the request for the first data to render the first modular contained widget component of the application user interface.

15. The system of claim 12, wherein the identified cache instance stores a plurality of cached instances of the first modular contained widget component, wherein each of the plurality of cached instances of the first modular contained widget component references a different set of database records.

16. The system of claim 12, wherein the first data to render the first modular contained widget component includes HyperText Markup Language data, styling data, one or more programmable scripts, and values associated with the one or more database records provided by the backend server.

17. The system of claim 12, wherein the memory is further configured to provide the one or more processors with instructions which when executed cause the one or more processors to:

in response to a determination that a third data is not cached, obtain the third data from the identified cache instance that cached an expired version of the third data, wherein obtaining the third data includes updating the expired version of the third data.

18. A computer program product, the computer program product being embodied in a non-transitory computer readable storage medium and comprising computer instructions for:
- determining a first expected usage start time associated with a first user;
- preloading a first data for a first modular contained widget component of an application user interface into an identified cache instance based on the first expected usage start time associated with the first user including by evicting a second data associated with a second modular contained widget component associated with a second user having a second expected usage start time different from the first expected usage start time associated with the first user;
- receiving from a client, a request for the first data to render the first modular contained widget component of the application user interface;
- determining at an intermediary server, whether the first data is cached at the intermediary server, wherein the first data is based at least in part on one or more database records stored at a backend server;
- in response to a determination that the first data is cached, obtaining the first data from the identified cache instance that cached the first data, wherein the cached first data is based at least in part on the one or more database records provided by the backend server to the intermediary server to maintain an updated version of the first data at the identified cache instance; and
- providing to the client the first data from the intermediary server.

19. The computer program product of claim 18, the computer program product further comprising computer instructions for: mapping the first data to the identified cache instance based on a widget identifier included in the request for the first data to render the first modular contained widget component of the application user interface.

20. The computer program product of claim 19, wherein mapping the first data to the identified cache instance is further based on a user identifier included in the request for the first data to render the first modular contained widget component of the application user interface.

* * * * *